United States Patent [19]

Herrmann et al.

[11] Patent Number: 4,539,460
[45] Date of Patent: Sep. 3, 1985

[54] METHOD OF HARDFACING VERTICAL WALLS

[75] Inventors: Bodo Herrmann, Bottrop; Paul Bastel; Selahattin Bas, both of Oberhausen, all of Fed. Rep. of Germany

[73] Assignee: M.A.N. Maschinenfabrik Augsburg-Nürnberg Aktiengesellschaft, Fed. Rep. of Germany

[21] Appl. No.: 511,089

[22] Filed: Jul. 6, 1983

[30] Foreign Application Priority Data

Jul. 6, 1982 [DE] Fed. Rep. of Germany ....... 3225125

[51] Int. Cl.³ ............................................... B23K 9/18
[52] U.S. Cl. ............................... 219/73.21; 219/76.14; 219/126
[58] Field of Search ................. 219/73 R, 73.21, 76.1, 219/76.14, 126, 73.2

[56] References Cited

U.S. PATENT DOCUMENTS 2,866,078 12/1958 Ballentine, Jr. et al. ......... 219/73 R
3,890,482 6/1975 Di Benedetto ................... 219/73 R
4,215,809 8/1980 Davis ............................... 219/76.14

Primary Examiner—Roy N. Envall, Jr.
Assistant Examiner—Alfred S. Keve
Attorney, Agent, or Firm—McGlew and Tuttle

[57] ABSTRACT

A method of hardfacing vertical walls comprises building up a layer of superimposed partly overlapping horizontally extending weld beads by depositing the beads in a submerged arc welding operation using relatively thin welding wires and welding powder which is fed over the weld wire. The welding powder is allowed to accumulate to provide a support for additional powder as welding progresses vertically.

2 Claims, 2 Drawing Figures

METHOD OF HARDFACING VERTICAL WALLS

FIELD AND BACKGROUND OF THE INVENTION

The invention relates to a method of hardfacing vertical walls by building up a coating of weld beads, which method can be advantageously applied to stationary constructional workpieces, for example for plating the inside of heavy vessel parts.

Known are hardfacing methods in which the surface layer is built up by shielded arc welding with tungsten electrodes and with a filler wire of the material to be deposited. What is disadvantageous in this prior art method is the low fusing rate and the complicated and expensive welding equipment also entailing a high sensitivity to disturbances.

Further known are welding methods with sheathed electrodes in which the electrodes are guided and the layers are built up manually. Such a method again involves a low fusing rate, and in addition a particularly high error rate in the first layer deposited on the basic material.

SUMMARY OF THE INVENTION

The invention is directed to a method permitting the reliable build-up of corrosion resistant layers in a relatively efficient, error-free, mechanized welding operation. Defective areas are particularly eliminated and the method is usable also for treating inside surfaces of hollow cylindrical bodies which are not accessible for manual welding and must be surfaced by mechanical remote-controlled welding.

Such cylindrical workpieces are, particularly, connections of piping systems and other components which have already been welded in place in conventional or nuclear apparatus and equipment, especially in primary circuits of nuclear power plants.

The inventive welding method, however, is further intended for any workpieces requiring high quality welding. Taking the above example of hardfacing in the nuclear power plant construction, the material of the built-up layer may be a high-quality nickel-chromium steel, but in other applications, other materials such as Inconel, titanium containing alloys, etc., may be used. INCONEL is a trademark which identifies a nickel and chromium plus molybdenum alloy having good heat stability.

The inventive method is simple and economical and insensitive to disturbances, to avoid any interruption in the welding process.

This is obtained, in accordance with the invention by building up a plurality of superimposed, partly overlapping, horizontal weld beads by depositing the beads in a submerged arc-welding operation using welding wires and welding powder.

Advantageously, the setting angles of the welding wire in the vertical and horizontal planes are determined empirically and fixedly adjusted as additional welding parameters, to ensure the most favorable structure of the material and deposit of the beads.

Alternatively, and advantageously, vertically repositionable supporting means which are guided by elements provided on the workpiece may be employed for holding the welding powder in place, or, if vertically extending cylindrical connections are surfaced inside, the welding powder itself which accumulated during the welding process in the interior of the work may be used as the supporting means.

This welding powder support has the advantage that it does not move along with the welding head, thus does not move relative to the workpiece during the welding operation, and does not cause disturbances in the weld pool.

The inventive method makes it possible to produce coatings of particularly high quality on vertically extending workpieces, at a high rate and low cost, so that it may be considered an ideal solution of the underlying problem.

Accordingly, it is an object of the invention to provide a method of hardfacing vertical walls comprising building up a layer of superimposed partly overlapping horizontal weld beads by depositing the beads in a submerged arc welding operation in which weld wires fed to the surface to be hardened and a welding powder is fed into the vicinity of the weld.

Another object of the invention is to provide a method of hardfacing vertical walls which is simple to carry out and inexpensive.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
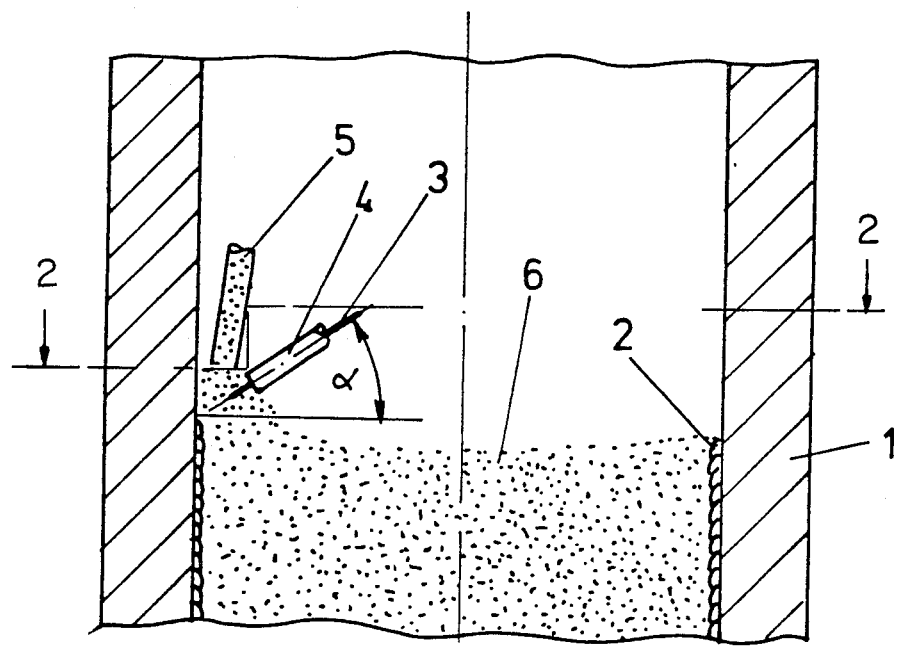
FIG. 1 is a vertical sectional view of a tube connection to be coated inside.
Figure 2:
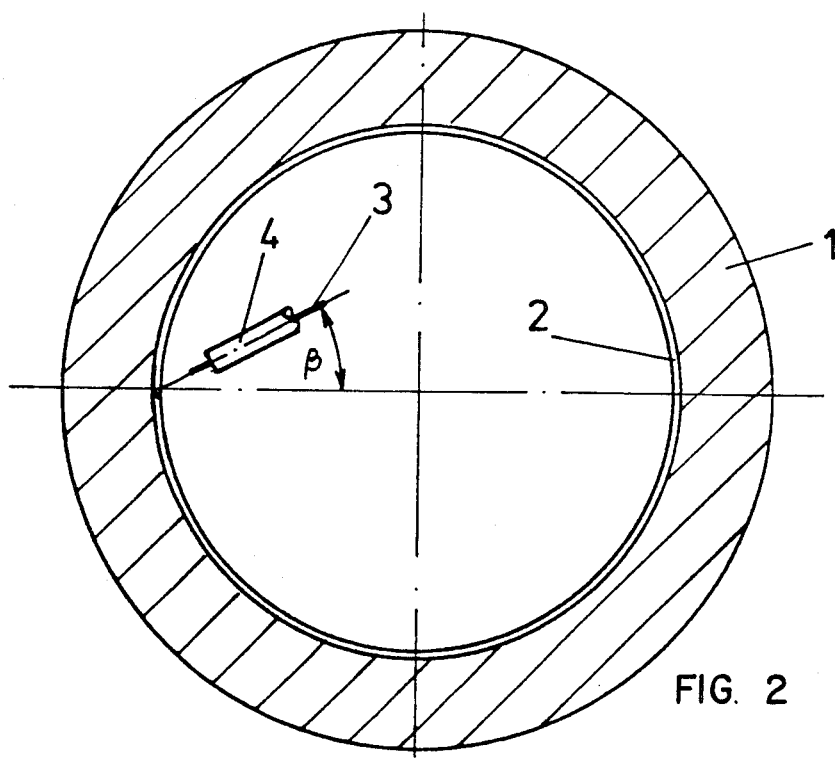
FIG. 2 is a horizontal sectional view taken along the line 2—2 of FIG. 1.

Referring to the drawings, in particular the invention embodied therein comprises a method of hardfacing vertical walls particularly the interiors of tubular members which comprises arranging the tubular member upright such as a tube 1 positioning a weld wire feeding nozzle 4 so that it feeds a weld wire 3 at a selected angle to the horizontal and at a selected radial angle in respect to the interior surface of the tube 1 which is to be hardened. The weld bead is applied to the surface continuously as the workpiece and the feeding nozzle are rotated relatively to each other. Welding powder is continuously fed through a feed tube 5 for the welding powder in which the bead is welded to the surface of the workpiece 1. The welding powder is fed at a rate to submerge the arc and it is preferably allowed to accumulate in a pile 6 within the tube 1 in order to facilitate the welding process.

As shown in FIG. 1, the workpiece 1 to be hardfaced inside is a vertically extending tube connection in the interior of which the already used welding powder 6 has accumulated. The coating 2 is built up of horizontally extending, partly overlapping weld beads, which may be deposited in a plurality of layers one on the other. The welding powder 6 is supplied through a feed channel 5 which opens close above the area of deposit. Welding powder 6 is supplied through the channel in an amount sufficient to completely cover the area.

The welding wire 3 is fed in through a welding nozzle 4 which is positioned at an a angle α relative to the horizontal, and at an angle β relative to the radius of the work. Angles α and β range between 0° and 45° and are determined empirically. The means that the angles are determined by testing aimed at obtaining the best quality of coating. The empirical way is necessary since the angles depend on the material used for the hardfacing, the diameter of the cylindrical workpiece, and the nature and layer thickness of the deposit. Particularly if an austenitic hardfacing material is employed, the optimum structure of the deposited material is controlled through determining the delta ferrite content.

Both welding nozzle 4 and powder supply channel 5 are supported on a frame (not shown). The frame moves both nozzle 4 and channe 5 in rotary motion and also effects a repositioning in height after every full revolution, thus providing for a uniform formation and overlapping of the beads. The structure for holding the powder in place may therefore be designed as a disc corresponding to the inside diameter of the work, if a cylindrical connection is concerned, or as a strip extending along the work, if a plate is coated.

If insides of tube connections are hardfaced, it is particularly advantageous to let accumulate a sufficient amount of spent welding powder at the bottom inside the work, as indicated in FIG. 1, so that a support for the newly supplied powder is formed. The powder 6 itself then serves as the means for holding new powder in place, and no separate structure is needed. Since the new powder placed on the underlying powder bed can be displaced particularly easy, the motion of welding nozzle 4 or of welding wire 3 fed therethrough is not hindered in any way, and experience has shown that, surprisingly, a disturbance-free welding operation and a hardfacing of particular high quality are thereby obtained. Welding powder which has not been used up, thus not scorified, may later be recovered from the bed by screening, and used again.

The design of the frame for guiding the powder supply, the welding nozzle, and for feeding the welding wire 3 is at the discretion of the designer, and a description is omitted, since any conventional construction may serve the purpose.

While a specific embodiment of the invention have been shown and described in detail to illustrate the application of the principles of the invention, it will be understood that the invention may be embodied otherwise without departing from such principles.

What is claimed is:

1. A method of hardfacing vertical walls of a workpiece comprising building up a layer of superimposed partly overlapping horizontal weld beads by depositing the beads in a submerged arc welding operation using a welding wire and welding powder, supplying the welding powder as the welding wire is fed to the weld bead using a powder feed to submerge the arc welding, and accumulating the welding powder in the workpiece being formed up to the arc welding so as to support the powder which is beind fed to the arc weld.

2. A method of hardfacing the interior of a tubular member comprising: arranging the tubular member upright, positioning a welding wire feeding nozzle so that it feeds wire at selected angles to the horizontal plane and radius of the member with respect to the interior surface to be welded; applying a weld bead to the surface continuously as the tubular member and feeding nozzle are rotated relatively to form superimposed partly overlapping horizontal weld beads; continuously feeding welding powder over the welding wire as it is welded to the tubular member; raising the weld wire relative to the tubular member as the welding progresses and allowing the welding powder to accumulate in the tubular member so that it forms a support for the powder which is beind fed to the weld bead.

* * * * *